United States Patent
Paré et al.

[11] Patent Number: 6,061,926
[45] Date of Patent: May 16, 2000

[54] CONTROLLED ENERGY DENSITY MICROWAVE-ASSISTED PROCESSES

[75] Inventors: J. R. Jocelyn Paré; Jacqueline M. R. Belanger, both of Nepean; Monique M. Punt, Ottawa, all of Canada

[73] Assignee: Her Majesty the Queen in right of Canada, as represented by the Minister of the Environment, Ontario, Canada

[21] Appl. No.: 09/186,480

[22] Filed: Nov. 5, 1998

Related U.S. Application Data

[60] Provisional application No. 60/064,303, Nov. 5, 1997.

[51] Int. Cl.⁷ ........................................ F26B 7/00
[52] U.S. Cl. .......................... 34/423; 34/426; 204/157.6
[58] Field of Search ............... 34/259, 265, 266, 34/268, 68, 423, 426, 380, 381; 219/678, 679, 745; 422/21; 426/237, 241, 243, 242; 204/157.5, 157.15, 157.43, 157.6

[56] References Cited

U.S. PATENT DOCUMENTS

| | | | |
|---|---|---|---|
| 4,247,988 | 2/1981 | Berkowitz et al. | 34/259 |
| 5,002,784 | 3/1991 | Pare et al. | 426/241 |
| 5,338,557 | 8/1994 | Pare | 426/241 |
| 5,377,426 | 1/1995 | Pare | 34/259 |
| 5,458,897 | 10/1995 | Pare | 426/241 |
| 5,519,947 | 5/1996 | Pare | 34/263 |
| 5,675,909 | 10/1997 | Pare | 34/265 |
| 5,732,476 | 3/1998 | Pare | 34/265 |
| 5,883,349 | 3/1999 | Kingston | 204/157.15 |
| 5,884,417 | 3/1999 | Pare | 34/263 |
| 5,932,075 | 8/1999 | Strauss et al. | 204/157.15 |

OTHER PUBLICATIONS

"Microwave Assisted Organic Synthesis — Organic Synthesis using Focused Microwaves" Prolabo Conference Presentation, Nov. 1998.

*Primary Examiner*—Pamela A. Wilson
*Attorney, Agent, or Firm*—McFadden, Fincham

[57] ABSTRACT

An effect is induced within a chemical system consisting of at least two substances having differing degrees of microwave transparency, by exposing the mixture to focused microwave energy having a generally uniform energy density level, and an energy density at a level exceeding the capacity of at least one of the substances to dissipate the energy as thermal energy. The treatment is carried out until the thermodynamic state of the system is in a non-equilibrium state. The rate at which the effect is carried out is substantially increased over that which would be expected under equilibrium thermodynamic conditions. The effect may consist of an exothermic or endothermic chemical reaction or a separation process including a volatilization process.

16 Claims, 3 Drawing Sheets

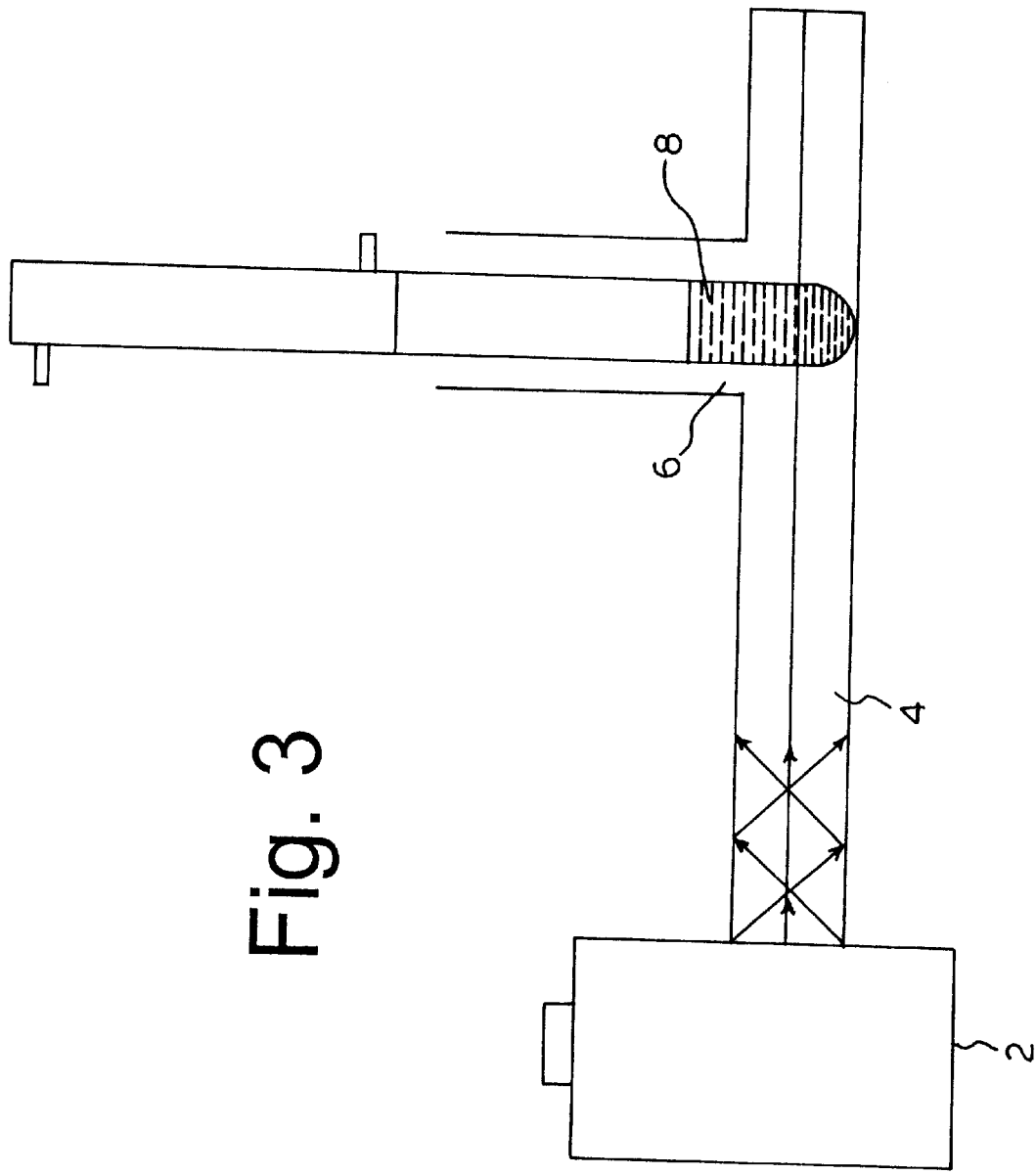

CONTROLLED ENERGY DENSITY MICROWAVE-ASSISTED PROCESSES

This application claims the benefit of U.S. Provisional Application Ser. No. 60/064,303, filed Nov. 5, 1997.

FIELD OF THE INVENTION

The present invention relates to microwave treatment of substances for inducing in a material an effect, such as reaction, desorption or extraction by microwave energy, particularly a process applying controlled energy density for a given mass over a given volume or given surface area to reach a sufficient energy level to bring about the effect.

BACKGROUND OF THE INVENTION

Microwave energy has been used in the prior art for extraction such as Ganzler, Salgo and Valko in *Journal of Chromatography*; 371, 1986: 299–306. However, this method applies microwave energy to a small amount of material immersed in a strongly absorbing medium resulting in most of the energy heating the medium, and a smaller amount affecting the material directly. Only thermal effects similar to conventional methods are noticed in this prior art process.

U.S. Pat. No. 5,458,897 to Paré discloses a method of extraction of various substances from organic material by exposure to microwave energy. The organic material is surrounded by a medium relatively transparent to microwaves, so that microwave energy is preferentially absorbed by the microwave absorbing constituents of the organic material, causing differential heating of the material over the medium sufficient to disrupt the structure of the organic material releasing the desired substances. Volatile oils and other substances can be extracted according to this method without significant heating.

U.S. Pat. No. 5,377,426 to Paré discloses a method of generating volatiles from liquid or solid materials enhanced by exposure to microwave radiation in the absence of solvent. Microwave energy according to this prior art method is absorbed preferentially by the liquid or solid material over generated gaseous volatiles allowing substantially complete volatilization of the desired substances.

Microwave energy has been shown to successfully enhance the extraction of desired components more quickly and efficiently than prior art methods, with greater selectivity and less product degradation. These methods rely on the different capacity of various materials to absorb microwave energy based on its dielectric constant. However, to date control of the microwave energy directed at the samples has been relatively random. While energy levels and frequency are known variables, direction and management of the microwave energy at high energy density levels has not been explored. In the prior art methods, high energy absorption would have necessitated extremely high power levels to induce an effect. Such high levels were not possible or practical, and cautionary means have been used to prevent accidental high energy exposure.

While microwave extraction has been shown to be effective, there is a need to develop protocols for extraction and sample treatment employing microwave energy concentrating means such as wave-guides at controlled frequency and energy levels, in order to reach an energy of activation to induce an effect. A focused microwave applicator and wave-guide can be used to raise the energy level of certain substances sufficiently to cause structural change or generate chemical reactions, and to significantly enhance the effectiveness of prior art microwave-assisted processes.

SUMMARY OF THE INVENTION

According to the process of the present invention, high density microwave energy is used to significantly reduce the overall energy demands to effect change(s) to the sample state and the time of treatment or exposure required. In addition, the increased energy absorbed by the sample has been found sufficient to cause modification of chemical structures and to generate chemical reactions. Through control of the specific frequency and energy density levels, selective structural changes can be made.

It has been found that energy density as applied for a given mass over a given volume or given surface area, can be controlled and managed, for instance using a focused microwave applicator and wave-guide, to reach a level of an energy of activation to initiate a microwave effect. This process employing controlled energy density can be used to significantly enhance the efficiency and the effects of numerous microwave-assisted processes.

It has been found further that when a given mass of a compound is exposed to microwave energy having an energy density exceeding a predetermined value, the energy absorbed by the compound exceeds the ability of the compound to dissipate the energy as thermal energy. As a result, a non-steady thermodynamic state is created within the compound, and a chemical effect, which may comprise an exothermic or endothermic chemical reaction, separation process, or other effect, occurs at a rate faster then would otherwise be expected in light of the energy amount applied to the compound. Accordingly, a process for inducing an effect within a substance at an accelerated rate may be carried out using microwaves, comprising the steps of:

providing a source of focused microwave energy having a substantially uniform energy density level;

providing a chemical system to be treated, comprising the substance and a second substance having a differing degree of microwave transparency, for example a solute dissolved in water;

exposing the chemical system to a microwave energy density at a level exceeding the ability of the selected substance to dissipate the energy as thermal energy;

continuing the microwave treatment until the thermodynamic state of the chemical system is in a non-steady state and until the chemical effect has occurred.

The particular energy density required to achieve this effect will vary, depending on the selected chemical system, its mass and volume.

The expression "effect" refers to any alteration to a characteristic of a compound or chemical system, and includes without limitation endothermic or exothermic reactions, separations, and phase changes.

High energy density in these applications can be measured as a level of energy equal to, or significantly larger than, the amount of energy required to initiate the effect in a given material, throughout the text this is also referred to as concentrated microwave energy.

It will be evident to those skilled in the art that means to effect such increases in energy density can be selected from existing equipment such as basic increased power level over a focused, or non-focused, volume. A preferred embodiment of this invention is to make use of so-called focused microwaves by means of so-called wave-guides. Yet, a more preferred embodiment of this invention, is the use of appropriate microwave devices that allow for the sustainment of so-called standing waves over a localized volume, such proximate location being selected for the insertion of target materials to be treated.

It will also be evident to those skilled in the art that such insertion can be performed prior to energy density increase for applications such as e.g., a conduit serving as a means to interface e.g., a separation device (e.g., chromatograph, etc.) and an appropriate detector (e.g., mass selective detector, etc.) or after the energy density increase has been effected such as e.g., to effect quasi-instantaneous disruption of physical micro-structures and enhance the extraction of matrices (e.g., soils, tissues, etc.) at relatively low power level.

It will be evident to those skilled in the art that the rate at which energy is imparted into a system when exposed to microwaves is of the order of 1,000,000 times faster than the system can diffuse such energy via conventional thermal mechanisms such as diffusion within a liquid medium. Similarly, the rate at which energy is imparted into a system when exposed to microwaves is of the order of 1,000 times faster than the system can diffuse such energy via conventional relaxation processes in a liquid medium. These ratio of rates are even more pronounced when the media are gaseous. It has been further found that when microwave energy levels exceed a threshold level, the energy imparted to the system exceeds the rate at which it is dissipated as thermal energy. As result, chemical processes occur at a rate higher than would be expected if all of the microwave energy were converted entirely into thermal energy. Consequently, the ability to harness, and subsequently control and manage the energy density applied, will lead to unusually high level of energy, over a short period of time, that in turn will lead to enhanced efficiency of known processes and, in some preferred embodiments of this invention, to new processes and phenomena. From a thermodynamic standpoint, such phenomena will occur when the system is under non-equilibrium or non-steady state conditions. The present invention provides methods, based upon the use of microwaves, to generate such conditions and harness their unique ability and usefulness. Method conditions leading to these phenomena are in accordance with the present invention, conditions where the energy density applied is sufficient to exceed the natural ability materials have to diffuse the microwave energy by conventional thermal processes. Under such conditions, varying materials will exhibit varying energy levels thus leading to novel and different mechanisms of diffusing said energy. Such mechanisms can include variations from conventional chemical equilibrium between 2 phases to non-hermodynamically favored chemical reaction pathways.

Those skilled in the art will recognize that such controlled application of specific energy density during microwave-assisted processes is advantageous in numerous applications such as e.g. in liquid-phase extraction, in gas-phase extraction, in volatiles generation, in supercritical fluid applications, in chemical reaction (both additive e.g., synthesis, and reductive e.g., oxidation, digestion), in chromatography enhancement, and other applications, the list provided herein being descriptive and non-exhaustive.

For example, in a liquid-phase extraction protocol, the process of the present invention will result in increased speed of disruption of the microstructure of the matrix (e.g. plant material) contents, thus accelerating the release of its contents. Localized application of such energy density will also lead to a much increased choice of matrices that could be so-treated, and to much increased selection of solvents that could be used without interfering with the extraction process.

In an alternative embodiment of the present invention, concentrated microwave energy is propagated within an applicator, on reaching sufficient density, the mixture to be treated is exposed to the microwave radiation.

In the case of the liquid phase extraction, the present invention can also be applied to a wide variety of components to be extracted from a liquid, or even a solid matrix. In the liquid phase aspect, the volatiles can be generated from the matrix and subsequently, various types of processes can be employed for recovering the desired product(s). In preparation for an liquid phase extraction, various types of liquids can be employed as will be evident from earlier references to Paré, namely U.S. Pat. Nos. 5,519,947, 5,002,704, 5,338,557 and others.

Applying this invention to gas-phase extraction of materials that are relatively transparent to microwaves (e.g. benzene) when compared to the bulk which in turn absorbs microwaves strongly (e.g. water) would lead in this particular case to greatly enhanced sensitivity, the sensitivity achieved in a much shorter time. On the other hand, applying this invention to gas-phase separation of strongly absorbing materials (e.g. water) from a mixture contained in relatively small volume, for example, an interface such as the one that allows the use of a Mass Spectrometer as a detector to a High Performance Liquid Chromatograph (HPLC-MS interface), would lead, in this particular case to greatly enhanced efficiency of the removal process.

Applying this invention to gas-phase extraction of materials that are only semi-transparent to microwaves (e.g. ethanol) when compared to the bulk which in turn absorbs microwaves strongly (e.g. water) would lead, in this particular case, to greatly enhanced sensitivity, said sensitivity achieved in a much shorter time. The use of the present invention thus leads to an enhanced capacity to deposit energy selectively into some components of a multi-component system. The latter phenomenon, in turn, gives rise to truly unique opportunities to carry out a number of processes such as extraction, synthesis, separation, etc. It will be evident to those skilled in the art that the ability of creating conditions under which components making up a system are found to be characterized by non-equilibrium conditions will lead not only to enhanced capacity to perform such processes, but in preferred cases, will lead to novel useful processes, mechanisms and paths.

In general, the gas phase extraction of materials may involve any type of material which has a component suitable for gas phase extraction. Such components are generally widely variable depending on the type of extraction desired and can include various types of natural or synthetic products such as organic derived matter. One use involves obtaining volatile oils from biological material. Such oils include not only those substances derived from plant and animal materials such as essential oils, but also substances such as lipids, fatty oils, fatty acids, etc., which, while not having the same degree of volatility as essential oils, are expressed or "volatilized" from the glandular or like system of such plant and animal materials.

The process is applicable to a wide variety of biological materials such as various types of tissue, for example plant material for flavouring and fragrance purposes, and other tissues, for example animal tissue. Examples of plant material include Canadian peppermint, seaweeds such as Irish moss, microalgaes, seeds, spices, various types of vegetables, for example onions, garlic, cellulosic materials and the like. In the case of animal tissue, liver, kidney, egg yolk, etc. or animal products such as sea anemones, sea cucumber and crustaceous products, for example lobster or other shell fish, warm and cold water fish, for example trout etc., can be employed to extract pigments, oils, etc. Other biological materials that may be used included bacterial cultures, cell cultures, tissue cultures, yeasts, fermentation broths, and any resulting biomass materials from such cultures, for example callus or the like. One application relates to the extraction of the desirable oils from fish components such as the liver which is a source of desirable acids for pharmaceutical and human purposes, for example volatile oils such as omega-3 and omega-6 oils and the like and the resulting biomasses therefrom. Other biological materials include soils containing one or more extractable materials in which the extractable material is capable of absorbing microwave energy in a transparent or semi-transparent solvent;

such soils as containing one or more extractable materials in which the extractable material is capable of absorbing microwave energy in a transparent or semi-transparent solvent;

such soils as containing plant material, or even plant material per se, as well a microalgae, can also be advantageously used. In the case of the biological material being a source of microalgae, various types of materials can be extracted from the microalgae such as fatty acids, different types of health foods, pigments and the like, the latter being useful, for example the cosmetic industry. In the case of the biological material being a plant material, various types of components can be extracted depending on the particular type of plant material such as fatty acids from numerous plants, glycerides, etc., for example from canola, olive, peanut, cotton and linseed plants.

The process is applicable to still further biological materials including processed foods, such as cakes of various types. Still further organic or biological materials include various types of petrochemical sources, which can be treated to provide extracted components such as $C_{30}$ to $C_{40}$ waxes, etc. In still further embodiments, other sources of biological materials or organic matter include the deposits known as low grade coals and peats, or even biomasses such as corals.

Applying this invention to chemical systems brought together for the purpose of effecting chemical reactions will lead to reaction pathways that would not be favored under thermodynamically equilibrated conditions. Those skilled in the art will recognize that the order of a chemical reaction between substances A and B and another substance C will take place according to the respective order of the so-called energy of activation, said energy of activation being based upon the energy level of each substance (i.e., A will react with C first if the energy of activation of reaction A+C is lesser than that of reaction B+C). Under thermodynamic equilibrium conditions, such as those normally present when thermal processes are at play, substances A, B, and C are at similar levels of energy. Under the conditions prescribed in this invention this will not be the case and, consequently, the order in which the energy of activation between substances A, B, and C, for example, may differ (i.e. although the energy of activation of reaction B+C may be higher than that of reaction A+C, reaction B+C may take place first as a result of substances B and C being brought selectively to a higher level of energy by the use of this invention). Similarly, it will be evident to those skilled in the art that, on a molecular basis, substances containing several reactive moieties may also exhibit a varying order of energy of activation between such moieties and lead to unexpected reactions from that substance. Still further, it will be evident to those skilled in the art, that the reaction between any of these 2 substances can be of conventionally known type, such as, for example endothermic or exothermic (i.e. absorbing thermal energy or releasing thermal energy) and that the concept of temperature is not limiting to the extent of use and application of this invention. In fact, it is possible to envisage the selective reaction of B and C, for example, characterized by the release of thermal energy (exothermic reaction) that would in turn allow for the reaction of A and C to take place.

One aspect of the present invention involves the use of the process for chemical reactions in which one component, having being obtained from the process of the present invention can be reacted with another component which may or may not have been treated by the process of the present invention. Enhanced activity levels of a component obtained by the process of the present invention can thus be used in chemical reactions to obtained known or other products where due to the effect obtained, the component is able to react under conditions under which would otherwise not be achievable or only achievable using more complicated and expensive techniques.

The overall microwave power or energy to be applied may be selected and varied according to the nature of the material of interest: preliminary tests can be performed to indicate which is most efficient for the desired process. Any wavelength within the microwave spectrum which is absorbed to some extent by a component of the material, can be used as only minor changes in the irradiation time will have to be implemented to compensate for changes in absorption. A typical frequency would be within the range of about 20 to about 300,000 MHZ.

BRIEF DESCRIPTION OF THE DRAWINGS

FIG. 3 is a schematic view of an apparatus for carrying out the invention.

DETAILED DESCRIPTION OF THE PREFERRED EMBODIMENTS

Figure 1:
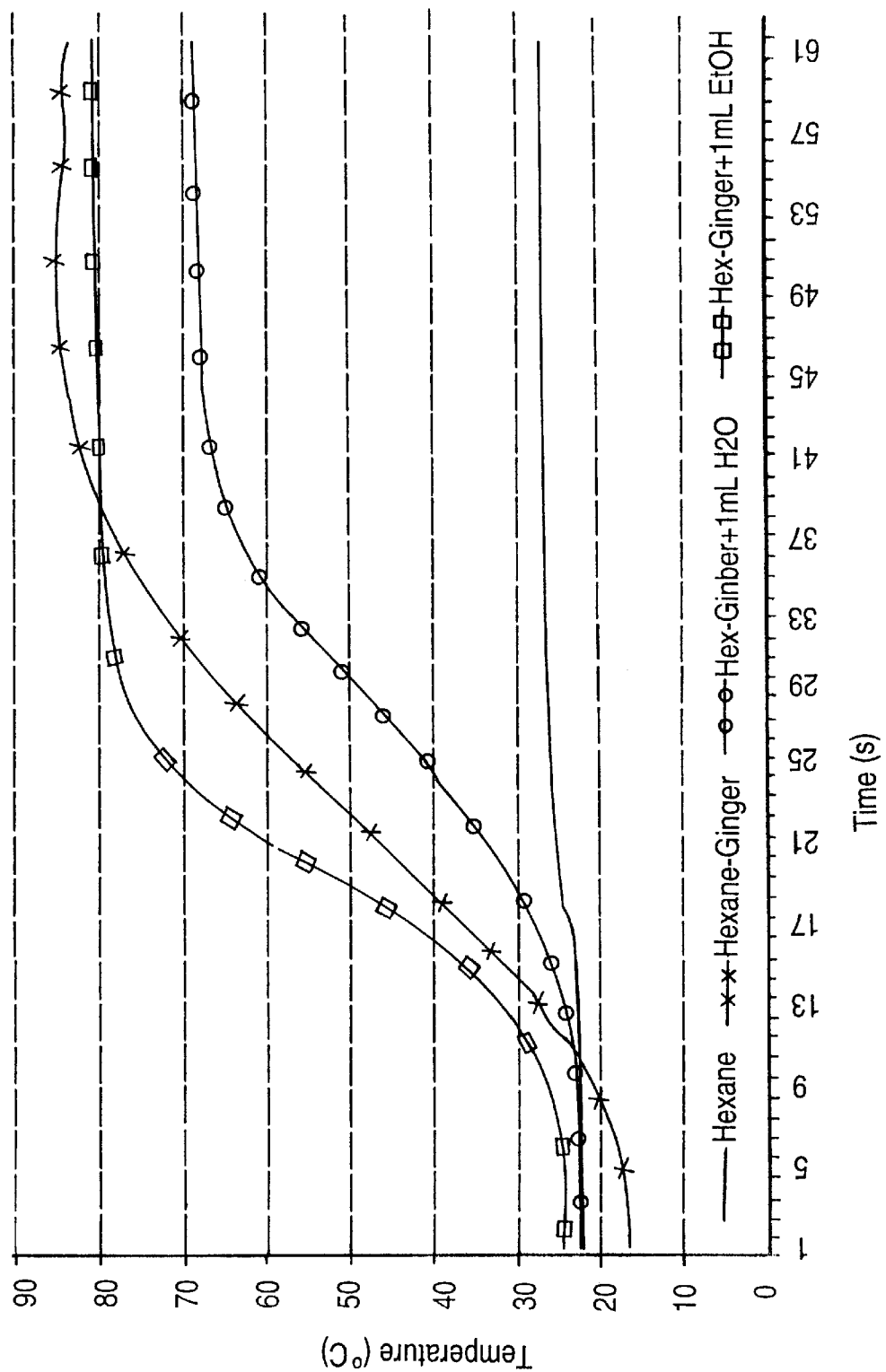
FIG. 1 is a graph illustrating the effect of varying microwave power levels and various chemical systems.
Figure 2:
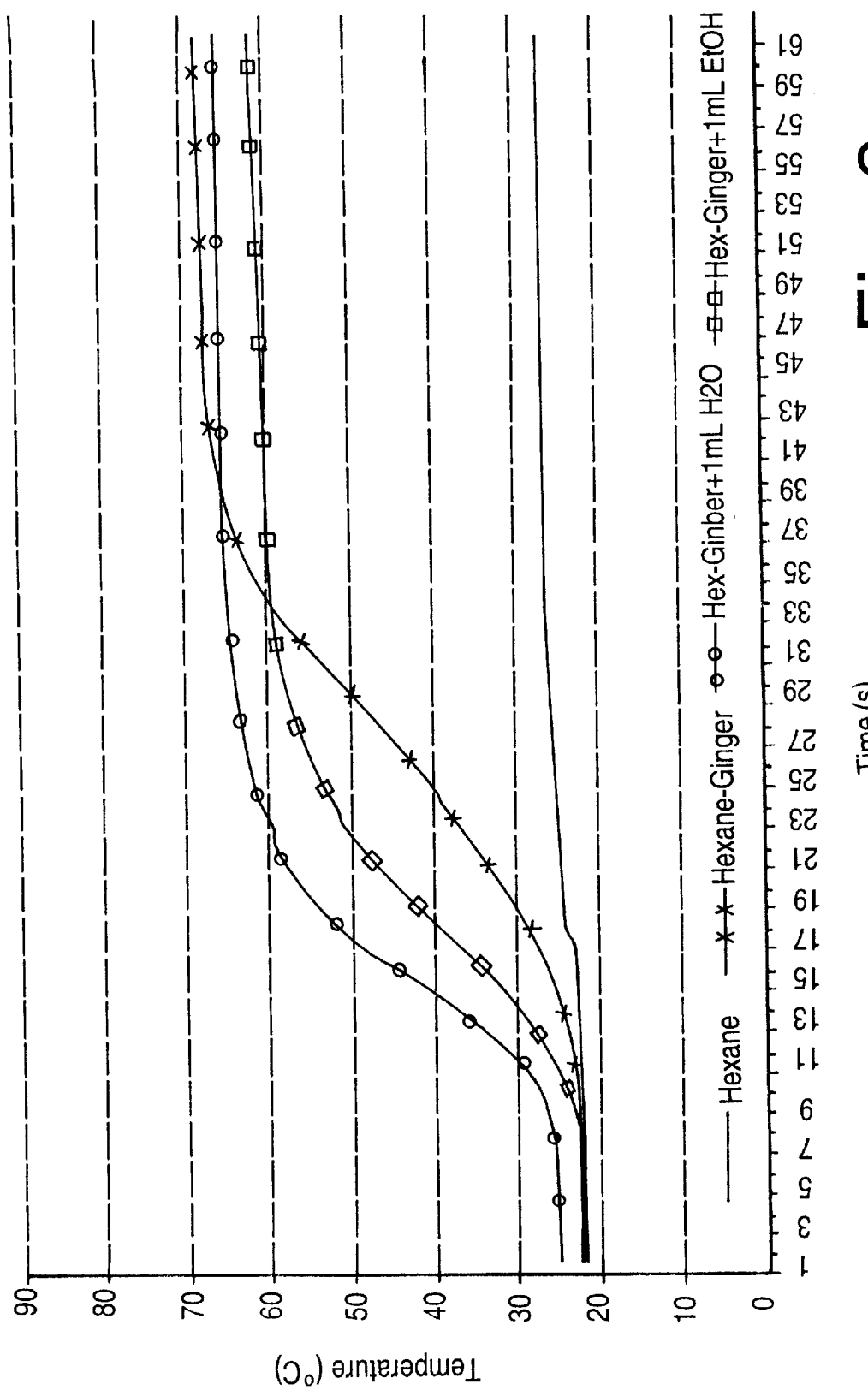
FIG. 2 is a graph as in FIG. 1, illustrating various additional chemical systems.

Apparatus for carrying out the present invention comprises in general terms a microwave generator 2 capable of a high power output, a wave guide 4 associated with the generator for channeling the waves, and a chamber 6 for receiving the focused wave energy. A reaction vessel 8 is retained within the chamber and is exposed to focused microwave energy at a selected wavelength and power level.

The following examples will serve as a guide to those skilled in the art, as it will be evident that they are only representative and not exhaustive nor in any way limiting.

EXAMPLE 1

In a preferred embodiment of this invention, use is made of a focused microwave applicator and wave-guide to ensure a uniform energy density over a given volume within the wave-guide. It will be apparent to those skilled in the art that this configuration allows for effecting different energy densities simply by controlling the power level being applied and that, for a given time period where microwaves are applied, the energy density varies directly with the power applied. When measuring the energy absorbed by a known quantity of a well-mixed solution, e.g. ethanol (78.9 mL) and water (7.2 mL) that was subjected to microwave irradiation for a specified amount of time (20, 30 or 40 seconds) under different power level for each time (150, 225 and 300

Watts, respectively), it was observed that the energy absorbed did not increase linearly with power as expected from previous work (actually energy absorbed decreased linearly by about 8% between 20 and 40 seconds at a given power level, and also linearly by about 8% between 150 and 300 watts for a given time of e.g., 20 seconds. These data show that, despite the near perfect miscibility of the materials used (ethanol and water), the energy absorbed, as measured from bulk temperature readings, decreased regularly with energy density as a result of the selective absorption by the water molecules over those of ethanol. Hence, applying this invention to gas-phase extraction of materials that are only semi-transparent to microwaves, e.g. ethanol, when compared to the bulk which in turn absorbs microwaves strongly, e.g., water, would lead, in this particular case to greatly enhanced sensitivity with the sensitivity being achieved in a much shorter time. On the other hand, applying this invention to gas-phase separation of strongly absorbing materials, e.g., water, from a mixture contained in a relatively small volume, e.g. an HPLC-IR interface, or a process control cavity would lead, in this particular case to greatly enhanced efficiency of the removal process.

EXAMPLE 2

In another preferred embodiment of this invention, use is made of a focused microwave applicator and wave-guide to ensure a uniform energy density over a given volume within the wave-guide. It will be apparent to those skilled in the art that this configuration allows for effecting different energy densities simply by controlling the power level being applied and that, for a given time period where microwaves are applied, the energy density varies directly with the power applied. When measuring the energy absorbed by a known quantity of a highly heterogeneous solution, e.g. ethanol (78.9 mL) and water (7.2 mL) as contained in a plant material (8 g of fresh mint leaves) that was subjected to microwave irradiation for a specified amount of time (20, 30 or 40 seconds) under different power level for each time (150, 225 and 300 watts) respectively), it was observed that the effect described in the previous example with respect to a non-linear increase of absorbed energy in function of applied power was even more dramatic. Actually, as much as 85% of the energy was selectively absorbed by the constrained water. This phenomenon was observed until the point where enough energy was absorbed by the constrained water to allow the water to free itself from the structure of the plant material (disruption of cellular structure as a result of liquid-to-gas expansion in volume of water). At that point, intense, spontaneous mixing occurred, thus facilitating diffusion process and a loss in selectivity in the apparent absorption process (apparent only since temperature increase is measured in the bulk). It will be evident to those skilled in the art, that the use of this invention will have significant impact on several key areas of microwave-assisted processes. For example, applying this invention to liquid-phase extraction would lead (in this specific example) to increased speed of extraction of plant contents, a much increased choice of matrices that could be treated, and to a greatly increased selection of the solvent type that could be used without interfering with the extraction process. Extraction can be performed with similar or better efficiency while using less overall energy but ensuring that initial energy density is high enough to cause the system under study to be under non-thermodynamic equilibrium, which in this specific example can be seen as applying more energy per unit mass than the mass (system) can diffuse via conventional diffusion steps. Hence the requirement to provide for a period whereby such diffusion processes can take place. Energy application is minimal during this period, hence low overall energy consumption.

EXAMPLE 3

This example demonstrates the inventive nature of a method disclosed herein and provides an insight in the level of innovation associated with the present invention. A commercially available focused microwave applicator is used at fixed power level for various times to treat a chemical system containing the compounds identified in tables 1–4. Under common equilibrium conditions where the energy density provided is insufficient to allow for excess energy to be imparted compared to the ability the system has to dissipate, the energy one obtains for the relative desorption of selected volatile organic compounds (VOCs present at ppm range) from water (10 mL) to be linear with respect to the level of energy applied (see Table 1 below). Even when the energy density is increased the phenomena is not observed until a certain time (total energy value—see Table 2 below). Table 2 and following illustrate the non-linear response of the chemical system when the energy density exceeds a threshold level, when this level is exceeded, the compounds dissipate less thermal energy than the total energy amount received from the microwave source by the compounds. In fact the result of this invention can best be seen in Table 3 below where the ratio of sensitivity between low energy density data and high energy density data are established. The data in Table 3 clearly show that the use of this invention, in this specific example, led to the ability to generate a head space above water which was contained volatile organic compounds in concentrations exceeding those found under equilibrium conditions. The advantage of using this invention, in this specific example, lie in unparalleled level of sensitivity for the generation and detection of volatile organic compounds (gas-phase extraction) compared to conventional means of doing the same. It will be evident to those skilled in the art that this unique feature of displacing the natural equilibrium and contents of substances within a given volume (concentration in the gas-phase) is synonymous to greatly varying chemical reaction rates under gas-phase reactions since reaction rate constants are proportional to the product of the concentration of reagents. Table 4 below is provided to exemplify the level of reproducibility and precision that can be achieved when using this invention. Energy levels reported upon therein were selected to be representative with respect to the range of irradiation times associated with energy data presented in Tables 1–3. These data are similar or better to data gathered for experiments dealing with the determination of such volatile organic compounds by conventional head space sampling performed at 85° C. over a period of 30 minutes. This example is provided herewith as a descriptive tool and is not in any way limiting or exhaustive.

TABLE 1

| Total Energy (Joules) Applied at Fixed Power of 80 Watts | | | |
|---|---|---|---|
| Compound | 2400* | 4800 | 7200 |
| Benzene | 1 | 1.22 | 1.44 |
| Toluene | 1 | 1.19 | 1.39 |
| Chlorobenzene | 1 | 1.30 | 1.58 |
| Ethylbenzene | 1 | 1.13 | 1.30 |
| - and p-Xylene | 1 | 1.14 | 1.32 |
| o-Xylene | 1 | 1.21 | 1.45 |

TABLE 1-continued

Total Energy (Joules) Applied at Fixed Power of 80 Watts

| Compound | 2400* | 4800 | 7200 |
|---|---|---|---|
| 1,3-Dichlorobenzene | 1 | 1.28 | 1.61 |
| 1,4-Dichlorobenzene | 1 | 1.35 | 1.72 |
| 1,2-Dichlorobenzene | 1 | 1.48 | 1.92 |

*normalized at 1 for E- = 2400 J

TABLE 2

Total Energy (Joules) Applied at Fixed Power of 160 Watts

| Compound | 2400* | 4800 | 7200 |
|---|---|---|---|
| Benzene | 1 | 1.15 | 1.73 |
| Toluene | 1 | 1.13 | 1.68 |
| Chlorobenzene | 1 | 1.28 | 2.07 |
| Ethylbenzene | 1 | 1.11 | 1.58 |
| - and p-Xylene | 1 | 1.13 | 1.63 |
| o-Xylene | 1 | 1.21 | 1.85 |
| 1,3-Dichlorobenzene | 1 | 1.38 | 2.26 |
| 1,4-Dichlorobenzene | 1 | 1.45 | 2.46 |
| 1,2-Dichlorobenzene | 1 | 1.57 | 2.79 |

*normalized at 1 for E- = 2400 J

TABLE 3

Applied Energy (J)

| Compound | 2400* | 4800 | 7200 |
|---|---|---|---|
| Benzene | 0.96 | 0.90 | 1.16 |
| Toluene | 0.94 | 0.90 | 1.14 |
| Chlorobenzene | 0.91 | 0.90 | 1.20 |
| Ethylbenzene | 0.92 | 0.90 | 1.12 |
| - and p-Xylene | 0.9 | 0.90 | 1.11 |
| o-Xylene | 0.9 | 0.89 | 1.14 |
| 1,3-Dichlorobenzene | 0.83 | 0.89 | 1.17 |
| 1,4-Dichlorobenzene | 0.83 | 0.89 | 1.18 |
| 1,2-Dichlorobenzene | 0.85 | 0.90 | 1.24 |

*determined from the ratio of 160 W/80 W at the corresponding energy level

TABLE 4

Precision (RSD) at given Energy Level

| Compound | 2400 Joules | 5760 Joules |
|---|---|---|
| Benzene | 4.1 | 3.10 |
| Toluene | 4.5 | 3.60 |
| Chlorobenzene | 4.4 | 3.10 |
| Ethylbenzene | 4.7 | 4.00 |
| - and p-Xylene | 4.6 | 4.10 |
| o-Xylene | 4.7 | 3.90 |
| 1,3-Dichlorobenzene | 4.6 | 3.40 |
| 1,4-Dichlorobenzene | 4.3 | 3.20 |
| 1,2-Dichlorobenzene | 3.9 | 2.60 |

EXAMPLE 4

In an another preferred embodiment of this invention, a known quantity of matrix, in this specific example, 5-gram aliquots of a biological material such as ginger roots powder, is immersed into a known volume of extractant, namely hexane (30 mL), selected for its transparency to microwaves relative to the matrix. The container comprising the solid-liquid system (ginger powder and hexane) is then inserted into a wave-guide where it is subjected to various energy density applications. The effect of such treatment is monitored via the chemical products so-extracted in terms of their nature and their quantity as well as via the temperature profile of the extractant. The former can be determined using conventional means such as gas chromatography and mass spectrometry whereas the later can be achieved via the use of infrared sensors or gas thermometers adequately fitted to the system. In this specific example, a gas thermometer was used. A conventional Soxhlet type apparatus was also used as a reference means to further monitor the quality of the products obtained throughout these experiments. In order to assess our ability to further remove the system from equilibrium, we have proceeded with modifying the dielectric nature of the matrix by adding to said matrix chemical substances that are also strong microwave absorbers relative to the solvent in order to further focus the energy—hence enhance the energy density—into the matrix. The substances used for this purpose are water and ethanol and a relatively small amount was used (1 mL) to show the inherent ability these materials have, when subjected to this invention to further focus the microwave energy and increase the energy density into the matrix. Table 5 provides the data for the reference Soxhlet work. Whereas Table 6 summarizes the findings of results obtained when using the present invention. Table 5 shows that, as expected from equilibrium conditions the relative yield of the extract is based solely on solubility and so-called "solvent power" parameters when various solvents are used. Table 6 however shows that the use of this invention, in this specific case, led to the production of more extracts in less time. In fact, all extracts were shown to be of similar quality by gas chromatographic mass spectrometric analysis. The precision of all experiments remained within 5%. The truly unique nature of this invention can be best seen in Diagram 1 below that depicts the temperature profile of the bulk hexane medium when the whole system is subjected to various level of energy density.

It will be evident to those skilled in the art that the addition of a strong microwave absorber led, in this specific example, to exposition of the material to a much increased energy density the latter giving rise to much improved extract quantity of similar or better quality than that obtained by conventional means. Overall energy reductions described herein is of the order of 99% compared to conventional means and even of 50% compared to other microwave-assisted processes taught earlier.

TABLE 5

Soxhlet Extraction (2-hour)

| Solvent | Relative Yield* |
|---|---|
| Hexane | 1 |
| Petroleum Ether | 0.784 |
| Dichloromethane | 1.04 |
| Ethanol | 1.13 |

*from GC-MSD data: normalized on hexane Soxhlet extract

TABLE 6

Controlled Energy Density Extraction (about 75 sec)

| Solvent | Modifier | Relative yield* |
|---|---|---|
| Hexane | None | 0.87 |
| Hexane | Ethanol | 1.14 |

TABLE 6-continued

Controlled Energy Density Extraction (about 75 sec)

| Solvent | Modifier | Relative yield* |
|---------|----------|-----------------|
| Hexane  | Water    | 1.31            |
| Ethanol | none     | 1.20            |

*from GC-MSD data: normalized on hexane Soxhlet extract

Furthermore, it will be evident to those skilled in the art, that the use of this invention will allow truly unique possibilities in terms of chemical synthesis. The present invention teaches means to utilize microwave energy in such a way that it is possible to effect selective heating of a portion of a macromolecule for a time-frame sufficient to allow reactions to take place at that location. The opposite could not, under current art, be achieved because no art to date provides for means to overcome gradual energy of activation associated with multiple-function molecules. The use of this invention with solid-phase support, for example, will demonstrate unique possibilities. Similarly, the use of this invention in conjunction with current sorbent, e.g. used in chromatographic processes, will allow for the use of new parameters in chromatography where selective absorption or relative boiling points will become parameters of importance in effect the require separation.

Similarly, it will be evident to those skilled in the art that the teachings of this invention are not limited to small-scale applications and that large-scale processing e.g. extraction, separation, etc. will benefit greatly from the use of this invention.

We claim:

1. A method for inducing an effect within a substance using microwaves, comprising the steps of:
    a) providing a source of focused microwave energy having a generally uniform energy density level;
    b) providing a chemical system to be treated comprising said a first substance and a second substance having a differing degree of microwave transparency;
    c) exposing said chemical system to said focused microwave energy, at an energy density exceeding the ability of said first substance to convert all of said energy into thermal energy;
    d) continuing treatment of said chemical system until the rate of absorption of microwaves by said system exceeds the rate of increase in thermal energy within said system and until said effect has occurred.

2. A method as defined in claim 1, including the step of recovering at least one component or product from said system after the equilibrium of said system has been deferentially shifted to said non-equilibrium state.

3. A method as defined in claim 1, wherein said generally uniform energy density level of focused microwave energy is obtained by providing a source of microwave energy generated by microwave generating means utilizing a wave guide.

4. A method as defined in claim 1, wherein said chemical system prior to said step of exposing to microwave energy is a liquid-gas system.

5. A method as defined in claim 1, wherein said chemical system prior to said step of exposing to microwave energy is a solid-liquid system.

6. A method as defined in claim 1, wherein said chemical system prior to said step of exposing to microwave energy is a mixture.

7. A method as defined in claim 1, wherein said chemical system prior to said step of exposing to microwave energy is a mixture of chemical substances, and a chemical reaction is initiated by said treatment.

8. A method as defined in claim 1, wherein said first substance is subjected to said focused microwave energy for a period sufficient to enhance the activity level of said first substance, and wherein said first substance having an enhanced activity level is recovered following the treatment.

9. A method as defined in claim 1, for controlling the energy level of an organic substance, wherein the step of providing a chemical system comprises:

providing as said first substrate an organic substance to be treated, said first substance having a microwave absorbable component which is more absorbable to microwave radiation than another component of said organic substance;

and wherein said first substance is treated by subjecting said first substance to a substantially uniform energy density by exposing said first substance to a microwave energy radiation level generated by a focused energy source; and including the step of selectively recovering said microwave absorbable component from said first substance which is more susceptible to microwave radiation.

10. A method as defined in claim 9, wherein said component is a volatile component.

11. A method as defined in claim 9, wherein said first substance is in combination with a liquid.

12. A method as defined in claim 11, wherein said liquid is a microwave transparent liquid.

13. A method as defined in claim 9, wherein said organic substance is a microwave transparent organic material.

14. A method as defined in claim 9, wherein said organic substance is a semi-transparent material.

15. A method as defined in claim 1, for initiating a chemical reaction comprising providing at least one organic compound capable of undergoing a chemical reaction; wherein the step of providing a chemical system comprises providing an organic compound and wherein the organic compound is exposed to said focused source of microwave energy to increase the chemical energy level of said organic compound and initiate a chemical reaction.

16. The method as defined in claim 1, wherein said substantially uniform energy density level of focused microwave energy is obtained by generating a standing wave.

* * * * *